(12) United States Patent
Obayashi et al.

(10) Patent No.: US 8,835,340 B2
(45) Date of Patent: Sep. 16, 2014

(54) METHOD FOR REGENERATION OF EXHAUST GAS TREATMENT CATALYST, AND EXHAUST GAS TREATMENT CATAYLST PRODUCED USING THE METHOD

(75) Inventors: Yoshiaki Obayashi, Tokyo (JP); Masashi Kiyosawa, Tokyo (JP); Masanori Demoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 231 days.

(21) Appl. No.: 13/387,519

(22) PCT Filed: Jan. 28, 2011

(86) PCT No.: PCT/JP2011/051690
§ 371 (c)(1),
(2), (4) Date: Apr. 17, 2012

(87) PCT Pub. No.: WO2011/152080
PCT Pub. Date: Dec. 8, 2011

(65) Prior Publication Data
US 2012/0204543 A1  Aug. 16, 2012

(30) Foreign Application Priority Data
Jun. 2, 2010  (JP) ................. 2010-126513

(51) Int. Cl.
| | | |
|---|---|---|
| B01J 38/72 | (2006.01) | |
| B01J 38/02 | (2006.01) | |
| B01J 21/06 | (2006.01) | |
| B01J 23/92 | (2006.01) | |
| B01J 37/06 | (2006.01) | |
| B01J 37/00 | (2006.01) | |
| B01J 23/30 | (2006.01) | |
| B01J 37/02 | (2006.01) | |
| B01J 35/02 | (2006.01) | |
| B01D 53/94 | (2006.01) | |
| B01J 37/08 | (2006.01) | |

(52) U.S. Cl.
CPC .. *B01D 53/9418* (2013.01); *B01D 2255/20707* (2013.01); *B01J 21/063* (2013.01); *B10J 35/04* (2013.01); *B01J 23/92* (2013.01); *B01J 37/06* (2013.01); *B01J 37/0009* (2013.01); *B01J 37/0036* (2013.01); *B01J 23/30* (2013.01); *B01J 37/0215* (2013.01); *B01D 2251/2062* (2013.01); *B01J 37/08* (2013.01); *B01D 2255/9202* (2013.01); *B01J 35/023* (2013.01)

USPC ............................................. 502/21; 502/56

(58) Field of Classification Search
CPC ...... B01J 2523/00; B01J 23/002; B01J 23/92; B01J 2523/47; B01J 2523/55; B01J 37/0009; B01J 37/0036; B01J 38/00; B01D 2255/20707; B01D 2255/20723; B01D 2255/20776; B01D 2257/302; B01D 53/8625; B01D 53/96
USPC ................................................ 502/20–56
See application file for complete search history.

(56) References Cited

U.S. PATENT DOCUMENTS

| | | | |
|---|---|---|---|
| 5,863,855 | A | 1/1999 | Nojima et al. |
| 2007/0032373 | A1 | 2/2007 | Matsumoto et al. |
| 2010/0292070 | A1 | 11/2010 | Obayashi et al. |

FOREIGN PATENT DOCUMENTS

| | | |
|---|---|---|
| CA | 2 706 530 C | 10/2012 |
| CN | 1172696 A | 2/1998 |

(Continued)

OTHER PUBLICATIONS

Chinese Office Action dated May 21, 2013, issued in corresponding Chinese Patent Application No. 201180002961.0 with English translation (16 pages).

(Continued)

*Primary Examiner* — Jennifer A Smith
(74) *Attorney, Agent, or Firm* — Westerman, Hattori, Daniels & Adrian, LLP

(57) ABSTRACT

A regenerated exhaust gas treatment catalyst (17) can be produced by coarsely grinding a used exhaust gas treatment catalyst (11); separating a coarsely ground material into coarse pieces (12) and a fine powder (13); finely grinding the coarse pieces (12); kneading the fine powder together with other raw materials, molding a kneaded material, and drying and burning a molded material to produce a base material (14); grinding a fresh exhaust gas treatment catalyst (15); forming a slurry solution of the ground product of the fresh exhaust gas treatment catalyst (15); coating the surface of the base material (14) with the slurry solution (16); and drying the base material (14) that has been coated with the slurry solution (16) and burning the base material (14) at a temperature higher than the burning temperature employed in the production of the exhaust gas treatment catalyst (15).

10 Claims, 3 Drawing Sheets

(56) References Cited

FOREIGN PATENT DOCUMENTS

| | | |
|---|---|---|
| JP | 57-180433 A | 11/1982 |
| JP | 3-127630 A | 5/1991 |
| JP | 09-108573 A | 4/1997 |
| JP | 2009-226388 A | 10/2009 |
| RU | 2 299 095 C2 | 5/2007 |
| RU | 2 372 143 C2 | 11/2009 |
| WO | 2006/067169 A1 | 6/2006 |
| WO | 2009/107276 A1 | 9/2009 |

OTHER PUBLICATIONS

Russian Notice of Allowance dated Sep. 5, 2013, issued in corresponding Russian Patent Application No. 2012102775, w/ English translation.
Extended European Search Report dated Mar. 5, 2014, issued in corresponding European Patent Application No. 11789492.3, (7 pages).
Canadian Office Action dated May 28, 2013, issued in corresponding application No. 2,768,961.
International Search Report of PCT/JP2011/051690, mailing date Apr. 26, 2011.

METHOD FOR REGENERATION OF EXHAUST GAS TREATMENT CATALYST, AND EXHAUST GAS TREATMENT CATAYLST PRODUCED USING THE METHOD

TECHNICAL FIELD

The present invention relates to a method of regenerating an exhaust gas treatment catalyst having ash adhering to a surface thereof and an exhaust gas treatment catalyst obtained by the method. The present invention is extremely effective particularly when employed to regenerate an exhaust gas treatment catalyst, mainly containing titanium oxide, for removing nitrogen oxide in exhaust gas from burned coal.

BACKGROUND ART

A discharge line for exhaust gas from equipment, such as, for example, a coal-fired boiler or the like, in which coal is burnt is provided with an exhaust gas treatment catalyst for treating nitrogen oxide ($NO_x$) in the exhaust gas. The exhaust gas treatment catalyst is obtained by the following process: titanium oxide ($TiO_2$) as a main component, and further tungsten oxide ($WO_3$), vanadium oxide ($V_2O_5$), and the like are kneaded together with a binder, molded into a honeycomb shape so as to have multiple holes, and calcined. A reducing agent such as ammonia ($NH_3$) is flowed into the holes together with the exhaust gas to bring the nitrogen oxide in the exhaust gas and the reducing agent into contact with the wall surfaces of the holes. This enables the decomposition and removal of the nitrogen oxide.

While such an exhaust gas treatment catalyst is being used, ash (fly ash) generated by burning coal is continuously flowed into the holes together with exhaust gas. Thus, components such as calcium (Ca) in the fly ash gradually adhere (to a thickness of several tens μm) on the inner wall surfaces of the holes. Such components inhibit the contact reaction between the nitrogen oxide and the reducing agent on the catalyst surface. Additionally, the fly ash itself is partially deposited inside the holes, and gradually makes it hard for exhaust gas to flow into the holes. Eventually, the fly ash completely blocks and clogs the holes, accordingly lowering the denitration performance.

Against this background, the exhaust gas treatment catalyst used for a predetermined period is regenerated as described in, for example, Patent Document 1. Specifically, an exhaust gas treatment catalyst is crushed such that 70 to 95 wt % of the whole exhaust gas treatment catalyst becomes coarse pieces having a size exceeding a threshold size S (any value in a range of 0.105 mm to 1.0 mm) (crushing step). Fragments thus obtained by crushing the exhaust gas treatment catalyst are separated into the coarse pieces having a size exceeding the threshold size S and fine particles having a size not larger than the threshold size S (separating step). The separated coarse pieces are pulverized into such a fine powder that has an average particle diameter not larger than 0.1 mm (pulverizing step). The fine powder is kneaded together with other raw materials and molded into an exhaust gas treatment catalyst (kneading step and molding step). The molded precursor is dried and calcined (around 500° C.) (drying step and calcining step). Thus, a regenerated exhaust gas treatment catalyst is obtained.

CITATION LIST

Patent Literature

[Patent Literature 1] Japanese Patent Application Publication No. 2009-226388

[Patent Literature 2] Japanese Patent Application Publication No. Hei 9-108573

[Patent Literature 3] Japanese Patent Application Publication No. Sho 57-180433

SUMMARY OF INVENTION

Technical Problem

The regeneration method described in Patent Document 1 can produce the exhaust gas treatment catalyst not bringing about a particular problem in many cases. However, it has been found out that, depending on the poisoned state and the like of the exhaust gas treatment catalyst used for a predetermined period, the denitration performance is not sufficiently recovered in some occasion.

As the measure, it is conceivable as described in, for example, Patent Document 2 and the like above that the exhaust gas treatment catalyst not having a sufficiently recovered denitration performance is coated with particulate components having a particle size distribution with two peaks between 0.1 μm and 50 μm and also having a denitration performance, such that the coating can be gradually worn off from the surface. Thereby, a sufficient denitration performance can be constantly demonstrated over a long period (approximately around 15,000 hours). Nonetheless, recently, the continuous use over a longer period (approximately 20,000 to 30,000 hours) has been strongly demanded. It has been difficult for the measure to meet such a demand.

In view of such circumstances, an object of the present invention is to provide a method of regenerating an exhaust gas treatment catalyst and an exhaust gas treatment catalyst obtained by the method, the exhaust gas treatment catalyst being continuously usable over a long period (approximately 20,000 to 30,000 hours), even when regenerated by first crushing, then re-molding, and calcining with a surface thereof being coated.

Solution to Problem

To solve the above-described problem, a method of regenerating an exhaust gas treatment catalyst according to a first invention is a method of regenerating an exhaust gas treatment catalyst having ash adhering to a surface thereof, characterized in that the method comprises:

a used catalyst crushing step of crushing the exhaust gas treatment catalyst that has been used;

a separating step of separating the crushed exhaust gas treatment catalyst into coarse pieces having a size exceeding a threshold size S and fine particles having a size not larger than the threshold size S;

a used catalyst pulverizing step of pulverizing the separated coarse pieces into a fine powder;

a molding step of molding the pulverized fine powder as a raw material into an exhaust gas treatment catalyst;

a precursor calcining step of calcining a molded precursor of the exhaust gas treatment catalyst;

a newly-made catalyst crushing step of crushing the exhaust gas treatment catalyst that has been newly made;

a slurrying step of slurrying the crushed newly-made exhaust gas treatment catalyst;

a slurry coating step of coating a surface of a base obtained by the calcination in the precursor calcining step with the slurry liquid; and a coating calcining step of calcining the base coated with the slurry liquid at a higher temperature than a calcination temperature during production of the crushed newly-made exhaust gas treatment catalyst, and the threshold size S has a value not smaller than 0.105 mm.

A method of regenerating an exhaust gas treatment catalyst according to a second invention is the method of regenerating an exhaust gas treatment catalyst according to the first invention, characterized in that the crushing step is a calcining step at a higher temperature by 25° C. or above than the calcination temperature during the production of the crushed newly-made exhaust gas treatment catalyst.

A method of regenerating an exhaust gas treatment catalyst according to a third invention is the method of regenerating an exhaust gas treatment catalyst according to the second invention, characterized in that the coating calcining step is a calcining step at a temperature of 700° C. or less.

A method of regenerating an exhaust gas treatment catalyst according to a fourth invention is the method of regenerating an exhaust gas treatment catalyst according to any one of the first to the third inventions, characterized in that the crushed and slurried newly-made exhaust gas treatment catalyst has an average particle diameter of 3 to 8 μm.

A method of regenerating an exhaust gas treatment catalyst according to a fifth invention is the method of regenerating an exhaust gas treatment catalyst according to the first to the fourth inventions, characterized in that a main raw material of the exhaust gas treatment catalyst is titanium oxide.

A method of regenerating an exhaust gas treatment catalyst according to a sixth invention is the method of regenerating an exhaust gas treatment catalyst according to the fifth invention, characterized in that the exhaust gas treatment catalyst is used to treat exhaust gas from a burned coal.

A method of regenerating an exhaust gas treatment catalyst according to a seventh invention is the method of regenerating an exhaust gas treatment catalyst according to the sixth invention, characterized in that the exhaust gas treatment catalyst is used to treat nitrogen oxide in the exhaust gas.

A method of regenerating an exhaust gas treatment catalyst according to an eighth invention is the method of regenerating an exhaust gas treatment catalyst according to the first to the seventh inventions, characterized in that the used catalyst crushing step is a step in which the exhaust gas treatment catalyst that has been used is crushed such that 70 to 95 wt % of the whole exhaust gas treatment catalyst that has been used becomes the coarse pieces having a size exceeding the threshold size S.

A method of regenerating an exhaust gas treatment catalyst according to a ninth invention is the method of regenerating an exhaust gas treatment catalyst according to the eighth invention, characterized in that the threshold size S has a value not larger than 1.0 mm.

A method of regenerating an exhaust gas treatment catalyst according to a tenth invention is the method of regenerating an exhaust gas treatment catalyst according to the first to the ninth inventions, characterized in that the used catalyst pulverizing step is a step in which the coarse pieces are pulverized such that the fine powder has an average particle diameter not larger than 0.1 mm.

Moreover, to solve the above-described problem, an exhaust gas treatment catalyst according to an eleventh invention is an exhaust gas treatment catalyst characterized by being regenerated by the method of regenerating an exhaust gas treatment catalyst according to any one of the first to the tenth inventions.

Advantageous Effects of Invention

In the method of regenerating an exhaust gas treatment catalyst according to the present invention, a surface of a base is coated with a slurry liquid of a crushed newly-made exhaust gas treatment catalyst, and calcined at a higher temperature than that during production of the crushed newly-made exhaust gas treatment catalyst. This can surely increase the degree of sintering a surface of a regenerated exhaust gas treatment catalyst. Hence, an exhaust gas treatment catalyst according to the present invention has a high-strength surface and is capable of demonstrating a sufficient wear resistance while keeping a sufficient denitration performance. Thus, the exhaust gas treatment catalyst according to the present invention is continuously usable over a long period (approximately 20,000 to 30,000 hours).

DESCRIPTION OF EMBODIMENTS

A method of regenerating an exhaust gas treatment catalyst according to the present invention and an exhaust gas treatment catalyst obtained by the method will be described on the basis of the drawings. However, the present invention is not limited only to embodiments described below.

Main Embodiment

A main embodiment of a method of regenerating an exhaust gas treatment catalyst according to the present invention and an exhaust gas treatment catalyst obtained by the method will be described on the basis of FIGS. 1 and 2.

Figure 1:
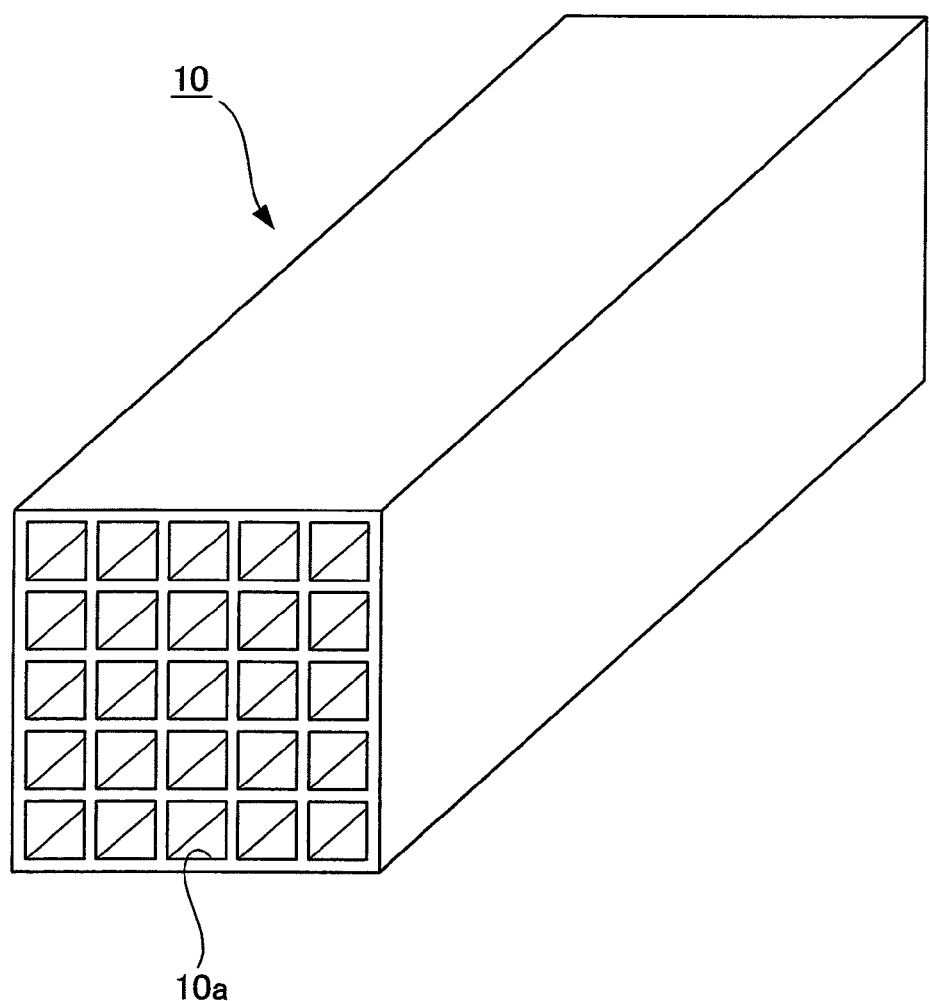
FIG. 1 is a schematic configuration diagram of an exhaust gas treatment catalyst used in a main embodiment of a method of regenerating an exhaust gas treatment catalyst according to the present invention.

As shown in FIG. 1, an exhaust gas treatment catalyst 10 according to the present embodiment is obtained by the following process: titanium oxide ($TiO_2$) as a main component and further tungsten oxide ($WO_3$), vanadium oxide ($V_2O_5$), and the like are kneaded together with a binder, molded into a honeycomb shape so as to have multiple holes 10a, and calcined.

Such an exhaust gas treatment catalyst 10 is installed in a discharge line for exhaust gas from equipment, such as a coal-fired boiler, for burning coal. A reducing agent such as ammonia ($NH_3$) is flowed into the holes 10a together with the exhaust gas to bring the nitrogen oxide ($NO_x$) in the exhaust gas and the reducing agent into contact with the wall surfaces of the holes 10a. This enables the decomposition and removal of the nitrogen oxide.

While the exhaust gas treatment catalyst 10 is being used, ash (fly ash) generated by burning coal is continuously flowed into the holes 10a together with exhaust gas. Thus, components such as calcium (Ca) in the fly ash gradually adhere (to a thickness of several tens μm) on the inner wall surfaces of the holes 10a. The components inhibit the contact reaction between the nitrogen oxide and the reducing agent on the surfaces of the holes 10a. Additionally, the fly ash itself is partially deposited inside the holes 10a, and gradually makes it hard for exhaust gas to flow into the holes. Eventually, the fly ash completely blocks and clogs the holes, accordingly lowering the denitration performance. For this reason, after a predetermined period of use, the catalyst is taken out from the exhaust gas line and transferred to a regeneration treatment facility.

Then, a used exhaust gas treatment catalyst 11 transferred to the regeneration treatment facility is introduced into a crushing machine, e.g., a crusher, without a washing treatment step using a washing liquid such as water. The catalyst is crushed such that 70 to 95 wt % of the whole exhaust gas treatment catalyst 11 becomes coarse pieces 12 having a size exceeding a threshold size S (any value in a range of 0.105 mm to 1.0 mm) (in FIG. 2, used catalyst crushing step S1).

The fragments obtained by crushing the exhaust gas treatment catalyst 11 are supplied onto a sieve having a mesh size of the threshold size S. Then, the fragments are separated into the coarse pieces 12 having a size exceeding the threshold size S and fine particles 13 having a size not larger than the threshold size S (in FIG. 2, separating step S2).

The fine particles 13 having passed through the meshes of the sieve are subjected to a disposal treatment. Meanwhile, the coarse pieces 12 left on the meshes of the sieve are introduced into a pulverizing machine, e.g., a hammermill, and pulverized to a fine powder having an average particle diameter not larger than 0.1 mm (preferably, 70 μm) (in FIG. 2, used catalyst pulverizing step S3).

Figure 2:
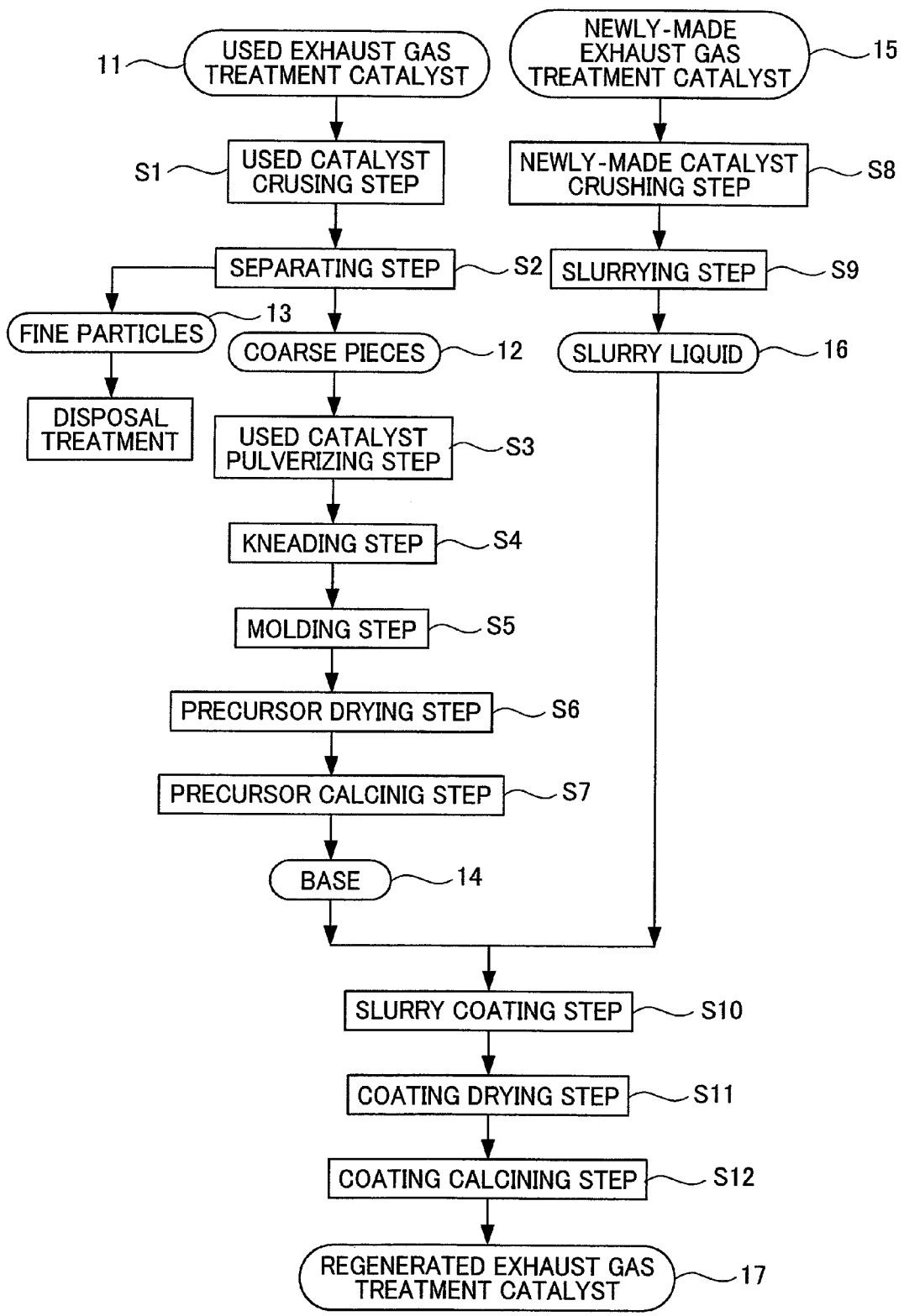
FIG. 2 is a flowchart showing the procedure of the main embodiment of the method of regenerating an exhaust gas treatment catalyst according to the present invention.

Then, the fine powder is supplied as a raw material together with other ingredients such as a binder and water into a kneading machine, e.g., a kneader, and uniformly kneaded (in FIG. 2, kneading step S4). The kneaded product is supplied into an extruder and molded into a honeycomb shape (in FIG. 2, molding step S5). This molded precursor is naturally dried and subsequently dried with hot air (100° C.) or the like (in FIG. 2, precursor drying step S6). Thereafter, the dried precursor is calcined in a calcining furnace (around 500° C.) (in FIG. 2, precursor calcining step S7). Thus, a base 14 of a regenerated exhaust gas treatment catalyst is obtained.

On the other hand, a newly-made exhaust gas treatment catalyst 15 similar to the exhaust gas treatment catalyst 10 is prepared, and introduced into and crushed with a crushing machine, e.g., a crusher (in FIG. 2, newly-made catalyst crushing step S8). The fragments obtained by crushing the newly-made exhaust gas treatment catalyst 15 are introduced into a ball mill together with water, and slurried while further crushed (to an average particle diameter of approximately around 3 to 8 μm) (in FIG. 2, slurrying step S9).

Next, the base 14 is immersed into a slurry liquid 16 obtained above, and the surface of the base 14 is coated with the slurry liquid 16 (in FIG. 2, slurry coating step S10). Then, the resultant is dried with hot air (100° C.) or the like (in FIG. 2, coating drying step S11), and introduced into a calcining furnace and calcined at a higher temperature (525 to 700° C.) than a calcination temperature (around 500° C.) during production of the exhaust gas treatment catalyst 15 (in FIG. 2, coating calcining step S12). Thus, a regenerated exhaust gas treatment catalyst 17 is obtained.

In other words, in the present embodiment, the surface of the base 14 is coated with the slurry liquid 16 of the crushed newly-made exhaust gas treatment catalyst 15, and calcined at a higher temperature than that during the production of the exhaust gas treatment catalyst 15. Thereby, the regenerated exhaust gas treatment catalyst 17 is obtained with a surely increased degree of sintering the surface thereof.

Therefore, according to the present embodiment, the exhaust gas treatment catalyst 17 has a high-strength surface, even when regenerated by first crushing, then re-molding, and calcining with the surface being coated. The exhaust gas treatment catalyst 17 is capable of demonstrating a sufficient wear resistance while keeping a sufficient denitration performance. Thus, the exhaust gas treatment catalyst 17 is continuously usable over a long period (approximately 20,000 to 30,000 hours).

Note that, if the calcination temperature in the coating calcining step S12 differs from the calcination temperature during the production of a newly-made exhaust gas treatment catalyst 15 which is to be crushed for coating the base 14 by 25° C. or above, this can more surely increase the degree of sintering the surface, which is very preferable. Meanwhile, if the calcination temperature in the coating calcining step S12 exceeds 700° C., the crystal structure of the main component titanium oxide ($TiO_2$) changes from anatase form to rutile form. This causes the exhaust gas treatment catalyst 17 to shrink, and may lower the denitration performance, which is not preferable.

In addition, if the crushed and slurried newly-made exhaust gas treatment catalyst 15 has an average particle diameter of 3 to 8, this can improve the wear resistance the most, which is very preferable.

Moreover, in the used catalyst crushing step S1, as described above, the used exhaust gas treatment catalyst 11 is preferably crushed such that 70 to 95 wt % of the whole exhaust gas treatment catalyst 11 becomes the coarse pieces 12. This is because, if the coarse pieces 12 formed by the crushing are less than 70 wt % of the whole used exhaust gas treatment catalyst 11, an excessive amount of the exhaust gas treatment catalyst is disposed of together with the fly ash and so forth. This consequently lowers the regeneration efficiency and increases the regeneration cost. Meanwhile, if the coarse pieces 12 formed by the crushing exceed 95 wt % of the whole used exhaust gas treatment catalyst 11, the fly ash and so forth may be incorporated into the base 14 by a large amount.

Other Embodiments

Note that, in the above-described embodiment, the description has been given of the case where the exhaust gas treatment catalyst 10 is molded into a honeycomb shape. However, the present invention is not limited thereto. As other embodiments, in the case of an exhaust gas treatment catalyst molded into, for example, a pellet shape, pipe shape, or other shapes, the present invention is also employable in a similar manner to the above-described embodiment.

Moreover, in the above-described embodiment, the description has been given of the case where the exhaust gas treatment catalyst 10 is installed in a discharge line for exhaust gas from equipment, such as a coal-fired boiler, for burning coal. However, the present invention is not limited thereto. As long as ash in exhaust gas adheres to and is deposited on a surface of an exhaust gas treatment catalyst, the present invention is employable in a similar manner to the above-described embodiment.

EXAMPLES

Hereinafter, description will be given of a confirmation test to confirm the effects of the method of regenerating an exhaust gas treatment catalyst according to the present invention and the exhaust gas treatment catalyst obtained by the method. However, the present invention is not limited only to the confirmation test described below.

Test Example 1

Preparation of Test Samples

<<Test Sample A>>

An exhaust gas treatment catalyst A ($TiO_2$=77.3%, $WO_3$=9.00%, $V_2O_5$=0.55%, others=13.15%) for denitration having a honeycomb shape (height: 150 mm, breadth: 150 mm, length: 800 mm, wall thickness: 1.15 mm, pitch (distance between the centers of adjacent walls): 7.4 mm, number of meshes (n): 20×20) was used in an exhaust gas line of a coal-fired boiler for approximately 70,000 hours. The catalyst A was crushed with a crusher to obtain fragments a.

Next, the fragments a obtained by the crushing were screened with a sieve (having a mesh size of 0.5 mm (the nominal dimensions are specified according to Japanese Industrial Standards (JIS))). The coarse pieces left on the sieve were pulverized (to an average particle diameter of approximately 20 μm) with a hammermill. The fine powder thus obtained (15 kg), an organic binder (0.7 kg), a glass fiber (1.5 kg (diameter: 11 μm, length: 3 mm)), and water (appropriate amount) were kneaded with a kneader and uniformed mixed. The obtained kneaded product was supplied into an extruder to prepare a precursor of an exhaust gas treatment catalyst having a honeycomb shape (height: 69 mm, breadth: 69 mm, length: 800 mm, mesh pitch: 7.4 mm, mesh opening: 6.25 mm, number of meshes (n): 9×9). The precursor was sufficiently naturally dried and subsequently dried with hot air (100° C.×5 hours). Thereafter, the precursor was subjected to a calcining treatment (500° C.×3 hours) in a calcining furnace. Thus, a test sample A of the regenerated exhaust gas treatment catalyst (base) was obtained.

<<Test Sample B>>

An exhaust gas treatment catalyst B ($TiO_2$=77.3%, $WO_3$=9.00%, $V_2O_5$=0.55%, others=13.15%) for denitration having a honeycomb shape (height: 150 mm, breadth: 150 mm, length: 800 mm, wall thickness: 1.15 mm, pitch (distance between the centers of adjacent walls): 7.4 mm, number of meshes (n): 20×20) was used in an exhaust gas line of a coal-fired boiler for approximately 65,000 hours. The catalyst B was crushed with a crusher to obtain fragments b.

Next, the fragments b obtained by the crushing were treated in a similar manner to the crushed fragments a of the test sample A. Thus, a test sample B of the regenerated exhaust gas treatment catalyst (base) was obtained.

<<Test Sample C>>

An exhaust gas treatment catalyst C ($TiO_2$=77.3%, $WO_3$=9.00%, $V_2O_5$=0.55%, others=13.15%) for denitration having a honeycomb shape (height: 150 mm, breadth: 150 mm, length: 800 mm, wall thickness: 1.15 mm, pitch (distance between the centers of adjacent walls): 7.4 mm, number of meshes (n): 20×20) was used in an exhaust gas line of a coal-fired boiler for approximately 60,000 hours. The catalyst C was crushed with a crusher to obtain fragments c.

Next, the fragments c obtained by the crushing were treated in a similar manner to the crushed fragments a of the test sample A. Thus, a test sample C of the regenerated exhaust gas treatment catalyst (base) was obtained.

<Test Method>

<<Denitration Rate>>

Each of the test samples A to C was cut into pieces (number of meshes: 6×7, length: 800 mm). One piece was put into a reactor. The denitration rate was obtained for each test sample under conditions described below. Note that, for comparison, the denitration rate of a newly-made exhaust gas treatment catalyst (comparison sample) was also obtained.

Test Conditions

Compositions of exhaust gas-$NO_x$: 150 ppm
$NH_3$: 150 ppm
$SO_2$: 800 ppm
$O_2$: 4%
$CO_2$: 12.5%
$H_2O$: approximately 11.5%
$N_2$: balance
Temperature of exhaust gas: 380° C.
Amount of exhaust gas: 19.56 $Nm^3$/hr
$U_{gs}$: 2.3 Nm/sec
AV: 23.26 $Nm^3/m^2 \cdot hr$
Denitration rate (%)={1−($NO_x$ concentration at catalyst outlet/$NO_x$ concentration at catalyst inlet)}×100

<Test Results>

Table 1 below shows the test results of the test samples A to C and the comparison sample.

TABLE 1

|  | Denitration rate (%) |
| --- | --- |
| Test sample A | 79.5 |
| Test sample B | 75.8 |
| Test sample C | 78.0 |
| Comparison sample | 82.1 |

As seen from Table 1 above, the denitration rates of the test samples A to C respectively obtained from the raw materials of the exhaust gas treatment catalysts A to C used under the above-described conditions were lower than the denitration ratio of the comparison sample (newly-made product) by approximately around 3 to 6%. Although the reason is not exactly known, it is conceivable that the used coal contained a relatively large amount of poisonous components and poisoned a relatively large amount of the catalyst components.

Test Example 2

Preparation of Test Samples

<<Slurry Liquid α>>

A newly-made exhaust gas treatment catalyst ($TiO_2$=77.3%, $WO_3$=9.00%, $V_2O_5$=0.55%, others=13.15%, calcination temperature: 500° C.) for denitration having a honeycomb shape used in a coal-fired boiler was crushed with a crusher. The fragments a obtained by the crushing (1.5 kg) and water (5 liters) were introduced into a ball mill (capacity: 7.2 liters) together with alumina balls (having diameters of 25 mm and 15 mm, each 2.1 kg), and crushed (to an average particle diameter of 4.94 μm). Then, the concentration thereof was adjusted (21%). Thus, a slurry liquid α was prepared.

<<Test Samples A11 to A16>>

Next, test samples A obtained in Test Example 1 above were each immersed in the slurry liquid α to coat the surface of the test sample A with the slurry liquid α. Then, the resultant test samples A were dried with hot air (100° C.×5 hours), and subjected to a calcining treatment (5 hours) at various temperatures (500° C., 550° C., 600° C., 650° C., 700° C., 750° C.) in a calcining furnace. Thus, test samples A11 to A16 of the exhaust gas treatment catalyst having the surface coated (the amount of coating on the outer surface area: 100 g/$m^2$) were prepared.

<Test Method>

<<Denitration Rate>>

The denitration rates of the test samples A11 to A16 were obtained in a similar manner to Test Example 1 above.

<<Wear Rate>>

One piece of each of the test samples A11 to A16 was put into a vertical reactor. A gas containing quartz sand (average particle diameter: 50 μm) (at a concentration of 300 g/$m^3$) was flowed therethrough from top to bottom under conditions described below. Thereby, the wear rates were obtained. It should be noted that the test sample A used had the meshes (n): 20×20 and a length of 100 mm, and that, for comparison, the wear rate of a newly-made exhaust gas treatment catalyst (comparison sample) was also obtained.

Test Conditions
Temperature: 20° C.
Pressure: atmospheric pressure
Flow rate
(through the cross section of the catalyst): 10 m/sec
Flowing period: 1 hour
Wear rate (%)={($W_0$−W)/$W_0$}×100
where $W_0$ represents the weight of the catalyst before the test, and W represents the weight of the catalyst after the test.
<Test Results>

Figure 3:
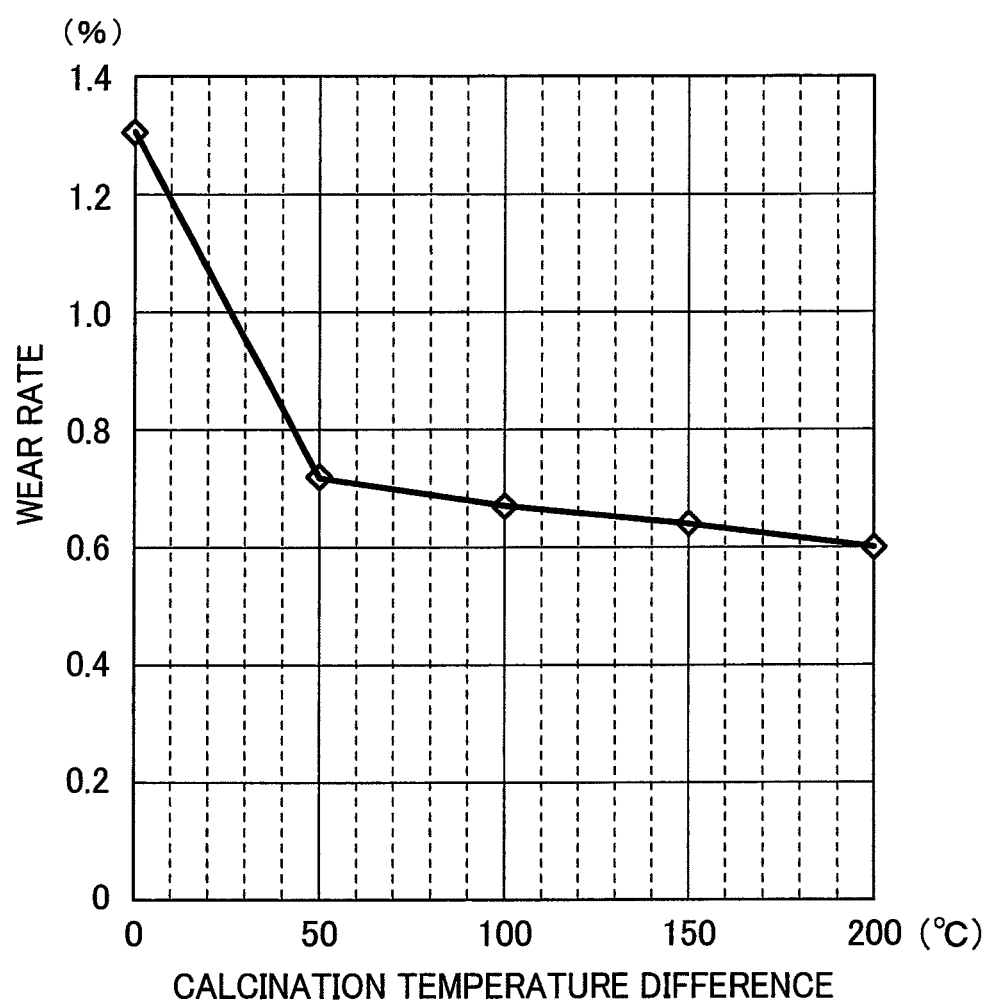
FIG. 3 is a graph for obtaining a relationship between a calcination temperature difference and a wear rate in Test Example 2 for the method of regenerating an exhaust gas treatment catalyst according to the present invention.

Table 2 below shows the test results of the denitration rate and the wear rate. In addition, FIG. 3 shows a graph for obtaining a relationship between a wear rate and a calcination temperature difference from the calcination temperature during the production of the crushed and slurried newly-made exhaust gas treatment catalyst.

TABLE 2

| | Coating calcination temperature (° C.) | Calcination temperature difference (° C.) | Denitration rate (%) | Wear rate (%) |
|---|---|---|---|---|
| Test sample A11 | 500 | 0 | 82.1 | 1.30 |
| Test sample A12 | 550 | 50 | 82.1 | 0.72 |
| Test sample A13 | 600 | 100 | 81.7 | 0.67 |
| Test sample A14 | 650 | 150 | 81.3 | 0.64 |
| Test sample A15 | 700 | 200 | 80.9 | 0.60 |
| Test sample A16 | 750 | 250 | *1 | *1 |
| Comparison sample | — | — | 82.1 | 0.51 |

*1 since the sample shrank and was obviously unusable as a catalyst, the measurement was omitted.

As seen from Table 2 above, the calcination temperature for the test sample A16 was too high (750° C.), and the crystal structure of the main component titanium oxide ($TiO_2$) changed from anatase form to rutile form. This increased the degree of sintering too excessively, and accordingly the test sample A16 shrank, so that the test sample A16 was not in a state capable of demonstrating a function as a catalyst.

Meanwhile, the test samples A11 to A15 (coating calcination temperature: 500 to 700° C.) were observed to be capable of demonstrating a sufficient performance in the denitration rate.

Furthermore, as seen from the context in FIG. 3, the test samples A12 to A15 (calcination temperature difference: ≥25° C.) were observed to be capable of demonstrating a sufficient performance in the wear rate (not higher than 1%; continuously usable over 20,000 to 30,000 hours).

Test Example 3

Preparation of Test Samples

<<Slurry Liquids α1 to α5>>
Slurry liquids α1 to α5 having average particle diameters shown in Table 3 below were prepared in a similar manner to the slurry liquid α in Test Example 2 above.

<<Test Samples A21 to A25>>
Next, test samples A obtained in Test Example 1 above were respectively immersed in the slurry liquids α1 to α5 to coat the surfaces of the test samples A with the slurry liquids α1 to α5. Then, the resultant test samples A were dried with hot air (100° C.×5 hours), and subjected to a calcining treatment (550° C.×5 hours) in a calcining furnace. Thus, test samples A21 to A25 of the exhaust gas treatment catalyst having the surface coated (the amount of coating on the outer surface area: 100 g/m²) were prepared.
<Test Method>
<<Denitration Rate>>
The denitration rates of the test samples A21 to A25 were obtained in a similar manner to Test Example 1 above.
<<Wear Rate>>
The wear rates of the test samples A21 to A25 were obtained in a similar manner to Test Example 2 above.
<Test Results>
Table 3 below shows the test results of the denitration rate and the wear rate.

TABLE 3

| | Slurry liquid | Average particle diameter (μm) | Wear rate (%) |
|---|---|---|---|
| Test sample A21 | α1 | 2.50 | 1.97 |
| Test sample A22 | α2 | 3.12 | 0.78 |
| Test sample A23 | α3 | 5.16 | 0.70 |
| Test sample A24 | α4 | 7.41 | 0.80 |
| Test sample A25 | α5 | 9.20 | 1.30 |

As seen from Table 3 above, the test samples A22 to A24 obtained by using the slurry liquids α2 to α4 having average particle diameters of 3 to 8 μm were observed to be capable of demonstrating a sufficient wear performance (not higher than 1%; continuously usable over 20,000 to 30,000 hours).

INDUSTRIAL APPLICABILITY

A method of regenerating an exhaust gas treatment catalyst according to the present invention and an exhaust gas treatment catalyst obtained by the method are extremely useful and beneficial in various industries.

| Reference Signs List | |
|---|---|
| 10 | EXHAUST GAS TREATMENT CATALYST |
| 10a | HOLE |

The invention claimed is:
1. A method of regenerating an exhaust gas treatment catalyst having ash adhering to a surface thereof, the method comprising:
   a used catalyst crushing step of crushing the exhaust gas treatment catalyst that has been used;
   a separating step of separating the crushed exhaust gas treatment catalyst into coarse pieces having a size exceeding a threshold size S and fine particles having a size not larger than the threshold size S;
   a used catalyst pulverizing step of pulverizing the separated coarse pieces into a fine powder;
   a molding step of molding the pulverized fine powder as a raw material into an exhaust gas treatment catalyst;
   a precursor calcining step of calcining a molded precursor of the exhaust gas treatment catalyst;

a newly-made catalyst crushing step of crushing the exhaust gas treatment catalyst that has been newly made;

a slurrying step of slurrying the crushed newly-made exhaust gas treatment catalyst;

a slurry coating step of coating a surface of a base obtained by the calcination in the precursor calcining step with the slurry liquid; and a coating calcining step of calcining the base coated with the slurry liquid at a higher temperature than a calcination temperature during production of the crushed newly-made exhaust gas treatment catalyst, wherein the threshold size S has a value not smaller than 0.105 mm.

2. The method of regenerating an exhaust gas treatment catalyst according to claim 1, wherein the coating calcining step is a calcining step at a higher temperature by 25° C. or above than the calcination temperature during the production of the crushed newly-made exhaust gas treatment catalyst.

3. The method of regenerating an exhaust gas treatment catalyst according to claim 2, wherein the coating calcining step is a calcining step at a temperature of 700° C. or less.

4. The method of regenerating an exhaust gas treatment catalyst according to claim 1, wherein the crushed and slurried newly-made exhaust gas treatment catalyst has an average particle diameter of 3 to 8 μm.

5. The method of regenerating an exhaust gas treatment catalyst according to claim 1, wherein a main raw material of the exhaust gas treatment catalyst is titanium oxide.

6. The method of regenerating an exhaust gas treatment catalyst according to claim 5, wherein the exhaust gas treatment catalyst is used to treat exhaust gas from a burned coal.

7. The method of regenerating an exhaust gas treatment catalyst according to claim 6, wherein the exhaust gas treatment catalyst is used to treat nitrogen oxide in the exhaust gas.

8. The method of regenerating an exhaust gas treatment catalyst according to claim 1, wherein the used catalyst crushing step is a step in which the exhaust gas treatment catalyst that has been used is crushed such that 70 to 95 wt % of the whole exhaust gas treatment catalyst that has been used becomes the coarse pieces having a size exceeding the threshold size S.

9. The method of regenerating an exhaust gas treatment catalyst according to claim 8, wherein the threshold size S has a value not larger than 1.0 mm.

10. The method of regenerating an exhaust gas treatment catalyst according to claim 1, wherein the used catalyst pulverizing step is a step in which the coarse pieces are pulverized such that the fine powder has an average particle diameter not larger than 0.1 mm.

* * * * *